US006390421B1

United States Patent
Rudd

(10) Patent No.: US 6,390,421 B1
(45) Date of Patent: May 21, 2002

(54) HANGER FOR MULTIPLE PIPES

(76) Inventor: John Scott Rudd, 6940 Reynolds Rd., Lake Ann, MI (US) 49650

(*) Notice: Subject to any disclaimer, the term of this patent is extended or adjusted under 35 U.S.C. 154(b) by 0 days.

(21) Appl. No.: 09/563,987

(22) Filed: May 3, 2000

(51) Int. Cl.[7] .................................................. F16Z 3/22
(52) U.S. Cl. ........................................ 248/68.1; 248/62
(58) Field of Search ............................ 248/68.1, 62, 73, 248/61, 58, 60, 74.2, 63, 231.51, 231.61, 59

(56) References Cited

U.S. PATENT DOCUMENTS

| | | | | |
|---|---|---|---|---|
| 2,354,919 A | * | 8/1944 | Lockwood | 248/68 |
| 2,384,158 A | * | 9/1945 | Carpenter et al. | 248/68 |
| 3,944,175 A | * | 3/1976 | Kearney | 248/49 |
| 4,884,528 A | * | 12/1989 | Steudler, Jr. | 119/72.5 |
| 4,907,766 A | * | 3/1990 | Rinderer | 248/57 |
| 5,035,383 A | * | 7/1991 | Rainville | 248/68.1 |
| 5,277,785 A | * | 1/1994 | Van Anglen | 205/117 |
| 5,593,115 A | * | 1/1997 | Lewis | 248/68.1 |
| 5,703,330 A | * | 12/1997 | Kujawski | 248/68.1 X |
| 5,876,000 A | * | 3/1999 | Ismert | 248/65 |

* cited by examiner

Primary Examiner—Leslie A. Braun
Assistant Examiner—A. Joseph Wujciak
(74) Attorney, Agent, or Firm—Douglas S. Bishop

(57) ABSTRACT

A hanger for hanging multiple pipes from a support member includes a pipe clamp with a circular opening. The pipe clamp has a top portion above the circular opening and a bottom portion below the circular opening. An attachment member is designed to attach to a support member and is interconnected with the top portion of the pipe clamp. An extension arm has one end interconnected with the bottom portion of the pipe clamp and another end which extends away from the bottom portion of the pipe clamp. A pipe clip is interconnected with the free end of the extension arm.

19 Claims, 3 Drawing Sheets

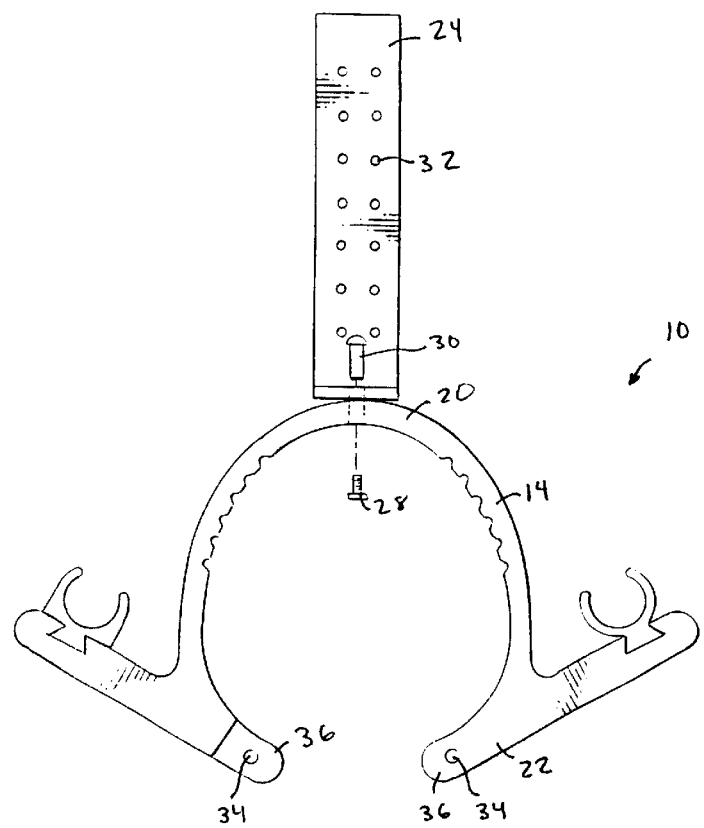

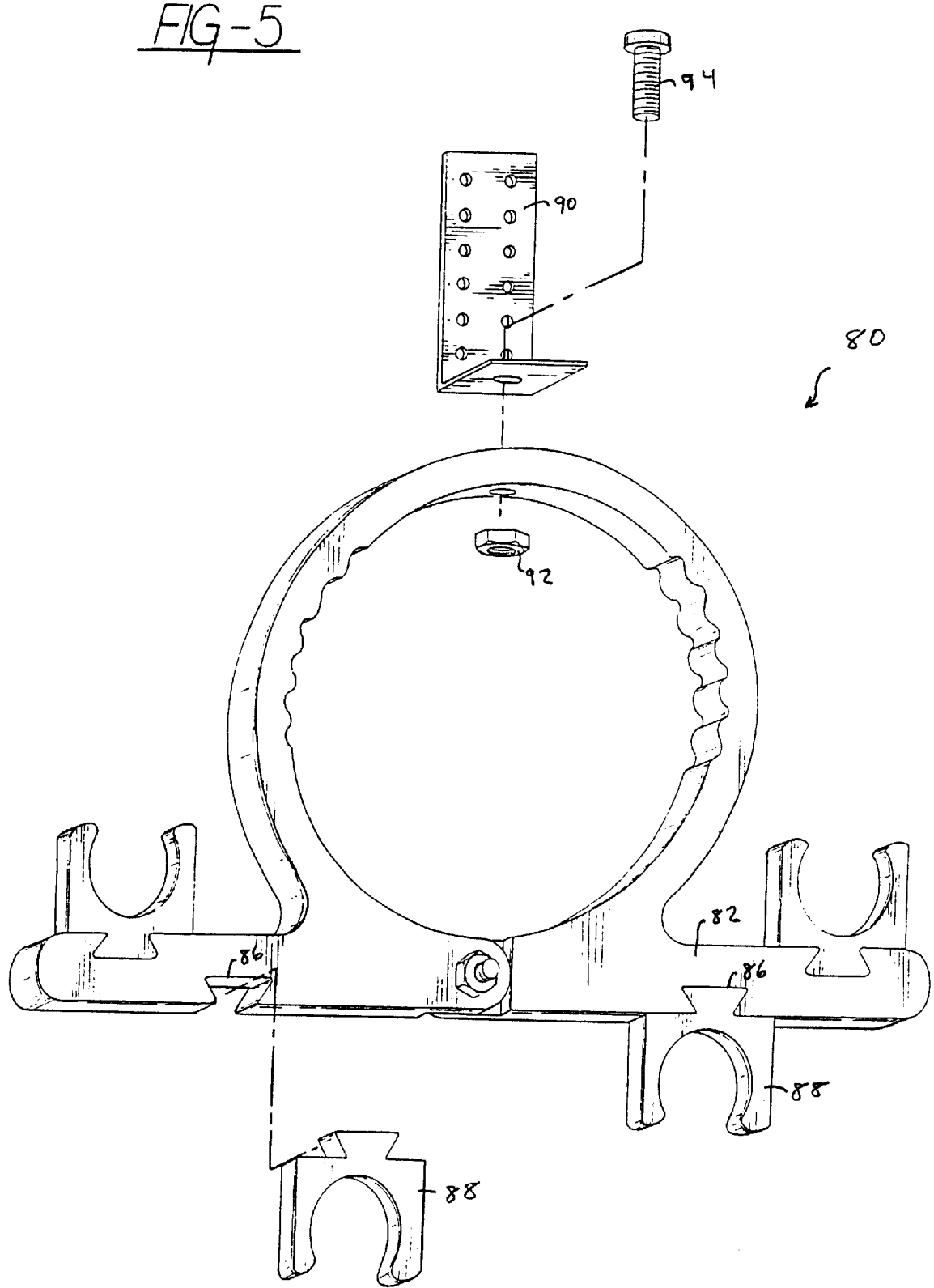

HANGER FOR MULTIPLE PIPES

FIELD OF THE INVENTION

The present invention relates generally to plumbing and, more specifically, to a hanger designed to support multiple pipes.

BACKGROUND OF THE INVENTION

Plumbing for residential and commercial buildings requires the installation of supply pipes to bring water to various fixtures, and drain or waste pipes to remove waste water from the fixtures. Typically, hot water supply pipes and cold water supply pipes are routed to various fixtures such as sinks, bathtubs, washing machines, and toilets. Each of these devices or fixtures typically produces waste water which is removed from the device by waste or drain pipes. Because the plumbing fixtures and devices are typically distributed at various locations in a building, both supply and drain pipes must be routed to a multitude of locations. A plumber or pipe installer is faced with the task of routing and interconnecting the supply and drain pipes throughout the building.

For most applications, copper or plastic water pipes are used to supply water to fixtures and devices while plastic or cast iron pipes are used as drain pipes. Both the supply and drain pipes must be installed in such a way that they are out of the way and are securely supported. Some of the pipes will be routed vertically inside of walls and supported or braced using straps and brackets. Horizontal runs of pipe are often routed immediately below the floor joists of the first floor of a building, either in a crawl space or basement. Because these pipes are located below the joists, it is preferred and usually necessary to support the pipes from the joists. For this purpose, a variety of straps, clamps, and hangers have been developed to interconnect both supply pipes and waste pipes with floor joists. Both types of pipes may be supported using elongated straps with the mid-portion of the strap supporting the pipe and both ends of the strap being attached to the floor joist. For additional security, the strap may be wrapped around the pipe one or more times. Use of these straps is especially common with drain pipes. As known to those of skill in the art, drain pipes are typically much larger in diameter than supply pipes. For example, for residential plumbing, ½ inch and ¾ inch diameter copper and plastic pipe is used for supplying water. However, 1 ½ inch to 4 inch diameter plastic or cast iron pipe is typically used for the drain. Therefore, pipes and hangers designed for use with small supply pipes typically do not work well with larger drain pipes. Likewise, hangers or straps designed for large drain pipes do not work particularly well to support smaller supply pipes.

A large percentage of a plumber's or pipe installer's time in installing pipes in a building is spent locating, installing and adjusting hangers or brackets for the pipes. Therefore, there is a need for improved hangers or supports to simplify the installer's job. Currently available hangers and supports do not adequately address this need. For example, there is a need for a hanger which will accommodate multiple pipes, preferably both supply and drain, that is not adequately met by the currently available hangers. It would be particularly advantageous if a single hanger could support several pipes and allow for a variety of configurations. Such a hanger would be most advantageous if it could support incoming supply pipes and outgoing drain pipes all in the same hanger.

Currently available pipe supports fall short of these desired characteristics. U.S. Pat. No. 3,588,011 to Peres et al. provides a one-piece holder clip for attaching a pair of similar sized pipes to a piece of wood in close proximity to one another. The device fails to provide for flexibility in pipe size or in positioning of the pipes. U.S. Pat. No. 4,550,891 to Schäty discloses a similar one-piece pipe clip with similar shortcomings.

U.S. Pat. No. 4,618,114 to McFarland provides a conduit spacer and support system. The system includes vertically and horizontally interlocking modular units designed to support a particular size of conduit. The system also includes a "U" shaped adapter designed to interconnect a smaller piece of conduit. The McFarland device is not directed to plumbing and does not address the need for supporting supply and waste pipe from a joist. The McFarland device also fails to provide other features of the present invention.

U.S. Pat. No. 4,779,828 to Münch and U.S. Pat. No. 5,482,234 to Lyon both disclose brackets designed to clamp a single piece of pipe or conduit. Once again, these devices fail to address the need for supporting multiple pipes or conduits using a single bracket or hanger.

U.S. Pat. No. 5,035,383 to Rainville discloses a clamp for clamping three similarly sized pieces of tubing or conduit in close proximity, and in a fixed arrangement relative to one another. The Rainville device lacks flexibility in the arrangement of the pipes being clamped, as well as in the sizes of the pipes.

U.S. Pat. No. 5,443,232 to Kesinger et al. discloses a TV cable hanger which includes an upper clamp for interconnection with a support pole and a lower clamp designed to support the TV cable. The two clamps are interconnected by a swivel. The Kesinger device is directed to a very particular need and is not suitable to the plumbing industry. Also, it does not provide for supporting multiple pipes in a variety of arrangements.

U.S. Pat. No. 5,703,330 to Kujawski discloses a carrier for a wiring harness and tube bundle which includes a "C" shaped portion designed to grasp a wiring harness and three (3) outwardly facing smaller "C" shaped clamps joined to the back side of the larger clamp. A pair of these clamps may be interconnected so as to completely surround the conduit. As with the prior devices, the Kujawski device fails to address the needs of the plumbing industry. Specifically, it fails to provide for a flexible arrangement of a variety of pipe sizes and also enforces a close proximity between the specific sizes of tubular elements it is designed to grasp. It also lacks a hanger for supporting the carrier from a support element.

SUMMARY OF THE INVENTION

The present invention overcomes the shortcomings of the prior art by providing a hanger for supporting multiple pipes from a support member. The hanger includes a pipe clamp with a generally circular opening. The clamp has a top portion above the opening and a bottom portion below the opening. An attachment member is designed to attach to the support member and is interconnected with the top portion of the pipe clamp. A first extension arm has one end interconnected with the bottom portion of the pipe clamp and another end that extends away from the bottom portion of the pipe clamp. A pipe clip is interconnected with the free end of the arm.

BRIEF DESCRIPTION OF THE DRAWINGS

FIG. 3 is an elevational front view of the hanger of FIGS. 1 and 2, partially disassembled and flexed open;

FIG. 4 is an exploded perspective view of the hanger of FIGS. 1–3 showing the constituent partes; and FIG. 5 is an exploded perspective view of an alternative embodiment of a hanger for multiple pipes according to the present invention.

DETAILED DESCRIPTION OF THE PREFERRED EMBODIMENTS

Figure 1:
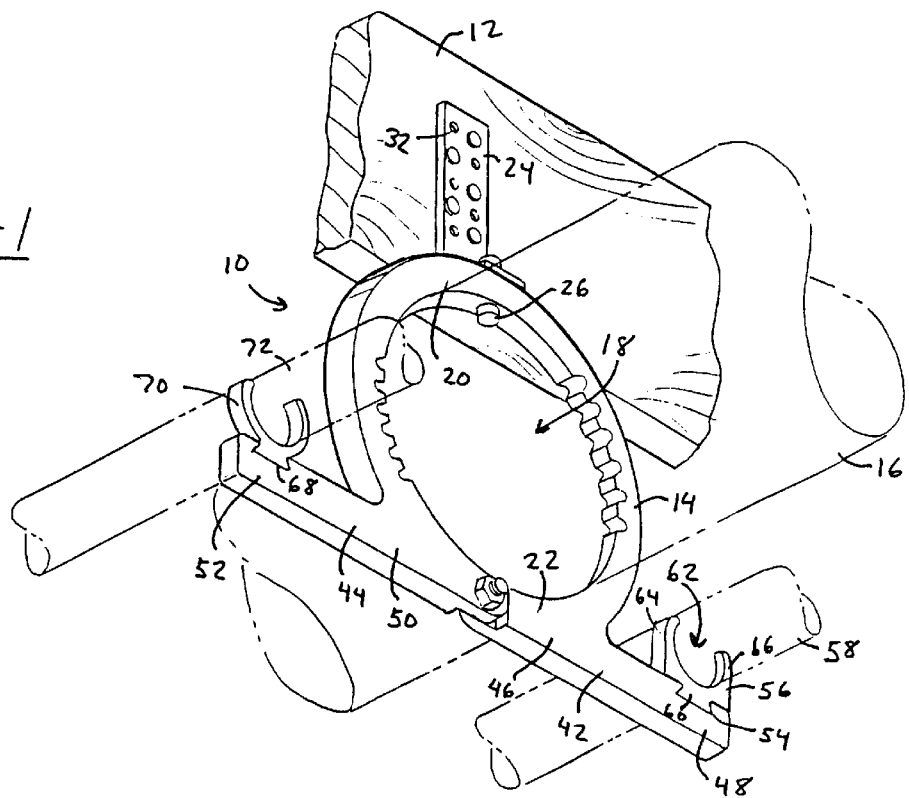
FIG. 1 is a perspective view of a first embodiment of a hanger for multiple pipes according to the present invention, as installed onto a floor joist.

Referring to FIGS. 1–4, a first preferred embodiment of a hanger according to the present invention is generally shown at 10. The hanger 10 is designed to support multiple pipes, such as water supply pipes and drain pipes, using a single hanger. The hanger is designed to interconnect with a support member such as a floor joist 12, as shown in FIG. 1. The hanger 10 has a central or clamp portion 14 designed to serve as a pipe clamp for a large diameter drain pipe 16. The clamp portion 14 is generally circular in shape and has generally circular opening 18 defined therethrough. The circular opening 18 is sized and shaped so as to accommodate the drain pipe 16. Therefore, the circular opening 18 is sized for one of the standard sized drain pipes, such as 1½ or 4 inch drain pipe. The clamp or central portion 14 of the hanger 10 is generally defined as having a top portion 20 above the circular opening and a bottom portion 22 below the circular opening 18. An attachment member 24 is interconnected with the top portion 20 of the clamp portion 14. The attachment member 24 is designed to attach to support member such as the floor joist 12. In the illustrated embodiment, the attachment member is a generally "L" shaped strap with the short leg of the "L" being interconnected with the top portion 20 of the clamp portion 14. The attachment member 24 may be interconnected with the top portion 20 in any of several ways such as using a bolt, clip, pin, or rivet. Preferably, the attachment member 24 may be interconnected with the top portion 20 with a connector 26 which allows the attachment member 24 to pivot relative to the remainder of the hanger 10. As best shown in FIGS. 3 and 4, the connector 26 may consist of a bolt 28 and an internally threaded receiver 30 which may be threaded together so as to interconnect the attachment member 24 to the top portion 20. The two-piece connector 26 may be disassembled during use of the hanger 10 to allow for ease of installation.

The longer leg of the "L" shaped attachment member 24 extends perpendicularly upwardly from the shorter leg and has a plurality of attachment holes 32 defined therein. Connectors such as nails or screws may be passed through these holes 32 to secure the attachment member 24 to a support member. As will be clear to those of skill in the art, other types of attachment member may be substituted for the illustrated version to allow the hanger 10 to be attached to other types of support members.

Figure 2:
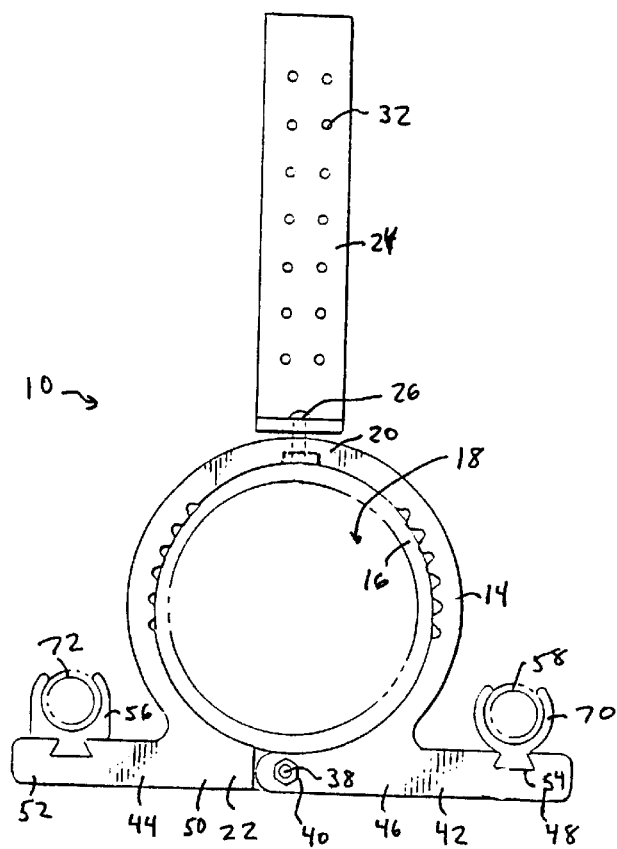
FIG. 2 is an elevational front view of the hanger of FIG. 1.

The bottom portion 22 of the central or clamp portion 14 of the hanger 10 is separable so as to allow the clamp 14 to be opened as shown in FIG. 3. For this purpose, the clamp portion 14 is preferably formed of a flexible material such as plastic to allow the bottom portion 22 to be opened. As shown, when opened, the clamp portion 14 is generally "C" shaped, with its opening pointed downwardly. A hole 34 is defined through each of the separated edges 36 of the clamp portion 14. These edges 36 are brought together, as shown in FIGS. 1 and 2, to return the clamp portion 14 to its generally circular closed shape. A bolt 38 is then passed through the holes 34 and secured with a nut 40 to hold the clamp portion 14 closed.

As mentioned earlier, the hanger 10 is designed to support multiple pipes. For this purpose, a first extension arm 42 and a second extension arm 44 are provided to support additional pipes. The first extension arm 42 has a first end 46 which is interconnected with the bottom portion 22 of the clamp portion 14. A second free end 48 of the first extension arm 42 extends away from the bottom portion 22 of the clamp portion 14. As shown, in one preferred embodiment, the first extension arm 42 extends horizontally sideways from the bottom portion 22. Likewise, the second extension arm 44 has a first end 50 interconnected with the bottom portion 22 and a second free end 52 which extends away from the bottom portion 22. The second extension arm 44 also extends horizontally, but in a direction opposite the first extension arm 42. The free end 48 of the first extension arm 42 has a receiving slot 54 defined in its upper side. A pipe clip 56 engages the receiving slot 54 and is designed to support a second pipe. In FIG. 1, a pipe 58 is shown being supported by the pipe clip 56. As shown, the pipe clip 56 has an engaging member 60 on its lower side configured to engage the receiving slot 54. The pipe clip 56 also has an upper "C" shaped opening 62 defined by a pair of receiving arms 64 and 66. Preferably, the pipe clip 56 is formed of a material such as plastic that easily but securely snaps around the pipe 58. Obviously, the pipe clip 56 may be provided in a variety of sizes and designs to allow it to grip various sizes pipe. For example, the clip could be a clamp that fully surrounds the pipe.

As shown, the second extension arm 44 also has a receiving slot 68 defined in the upperside of its free end and an alternative design of a pipe clip 70 is shown engaged in the receiving slot 68. The pipe clip 70 differs from the pipe clip 56 in that it has less robust, and therefore more flexible, receiving arms. Obviously, other designs of pipe clips may be provided that engage with the receiving slots 54 and 68. Also, the pipe clips may be interchanged or substituted. For example, in FIG. 2, the pipe clip 56 and pipe clip 70 are shown reversed. That is, pipe clip 70 is engaged in the receiving slot 54 in the first extension arm 42 while the pipe clip 56 is engaged in the receiving slot 68 in the second extension arm 44.

In use, a plumber or pipe installer would route a drain pipe 16 and supply pipes 58 and 72. The nut 40 and bolt 38 may then be removed from the bottom portion 22 of the clamp portion 14 and the clamp portion opened and positioned around the drain pipe 16. The clamp portion 14 may then be squeezed shut around the drain pipe 16 and the nut and bolt used to secure the clamp portion 14 in this position. Alternatively, the clamp portion 14 may be slid over the end of the drain pipe 16, avoiding the need to open the clamp portion 14. For this purpose, certain embodiments of the present invention may be provided without the separable edges, instead forming the clamp portion 14 as a unitary closed piece. After the clamp portion 14 is secured around the drain pipe 16, appropriately sized and shaped pipe clips may be engaged in the receiving slots 54 and 68. Supply pipes may then be clipped into the pipe clips so they are supported.

Referring now to FIG. 5, an alternative embodiment of a hanger 80 according to the present invention is shown. This embodiment differs from the first embodiment in that a first extension arm 82 and second extension arm 84 both have secondary receiving slots 86 defined in their lower sides inboard of the receiving slots provided in the other embodiment. As shown, these lower slots 86 allow additional pipe clips 88 to be engaged with the lower side of the hanger 80 to support additional pipes. Obviously, the various receiving slots may be positioned differently, or even additional slots may be provided, to allow pipe clips to be located in other locations. The embodiment of FIG. 5 also differs from the prior embodiment in that the attachment member 90 is interconnected with the remainder of the clamp 80 using a simple nut 92 and bolt 94.

As will be clear to those of skill in the art, the disclosed embodiments of the present invention may be altered in various ways without departing from the intent or scope of the present invention. If is the following claims, including all equivalents, which define the scope of the invention.

I claim:

1. A hanger for hanging multiple pipes from a support member, the hanger comprising:
    a pipe clamp having a generally circular opening defined therethrough, the clamp having a top portion above the circular opening and a bottom portion below the circular opening;
    an attachment member configured for attachment to the support member, the attachment member interconnected with the top portion of the pipe clamp and extending upwardly away from the top portion;
    a first extension arm having a first end interconnected with the bottom portion of the pipe clamp and a second free end extending away from the bottom portion of the pipe clamp in a first direction; and
    a first pipe clip interconnected with the free end of the first extension arm.

2. The hanger according to claim 1, further comprising a second extension arm having a first end interconnected with the bottom portion of the pipe clamp and a second free end extending away from the bottom portion of the pipe clamp in a second direction; and
    a second pipe clip interconnected with the free end of the second extension arm.

3. The hanger according to claim 2, wherein second direction is opposite the first direction.

4. The hanger according to claim 3, wherein the first and second arms extend generally horizontally.

5. The hanger according to claim 1, further comprising an additional pipe clip interconnected with the first extension arm.

6. The hanger according to claim 5, wherein the first pipe clip is above the first extension arm and the additional pipe clip is below the first extension arm.

7. The hanger according to claim 1, wherein the first pipe clip comprises a pair of receiving arms defining a "C" shaped opening for receiving a pipe having a diameter, each of the receiving arms having an end, the ends being separated by a distance less than the pipe diameter.

8. The hanger according to claim 1, wherein the first pipe clip is detachably interconnected with the free end of the first extension arm.

9. The hanger according to claim 8, wherein the free end of the first extension arm includes a receiving slot and the first pipe clip includes an engaging member for detachably interconnecting with the receiving slot.

10. The hanger according to claim 1, wherein the first extension arm is integral with said pipe clamp.

11. The hanger according to claim 1, wherein the pipe clamp is integrally formed of a flexible material and comprises a pair of separable edges that may be spread apart to open the pipe clamp.

12. The hanger according to claim 11, wherein the separable edges each have a hole defined therethrough for interconnecting the separable edges.

13. The hanger according to claim 1, wherein the attachment member is pivotally interconnected with the top portion of the pipe clamp.

14. The hanger according to claim 1, wherein the pipe clamp is integrally formed of a flexible material and comprises a pair of separable edges that may be spread apart to open the pipe clamp, the separable edges each having a hole defined therethrough for interconnecting the separable edges.

15. A hanger for hanging multiple pipes from a support member, the hanger comprising:
    a generally circular pipe clamp having a generally circular opening defined therethrough, the clamp being integrally formed of a flexible material and having a top portion above the circular opening and a bottom portion below the circular opening, the pipe clamp further comprising a pair of separable edges that may be spread apart to open the pipe clamp;
    an attachment member configured for attachment to the support member, the attachment member interconnected with the top portion of the pipe clamp;
    a first extension arm having a first end interconnected with the bottom portion of the pipe clamp and a second free end extending away from the bottom portion of the pipe clamp in a first direction;
    a first pipe clip interconnected with the free end of the first extension arm;
    a second extension arm having a first end interconnected with the bottom portion of the pipe clamp and a second free end extending away from the bottom portion of the pipe clamp in a second direction opposite the first direction; and
    a second pipe clip interconnected with the free end of the second extension arm.

16. The hanger according to claim 15, wherein the separable edges each have a hole defined therethrough for interconnecting the separable edges.

17. The hanger according to claim 15, wherein the attachment member is pivotally interconnected with the top portion of the pipe clamp.

18. A hanger for hanging multiple pipes from a support member, the hanger comprising:
    a pipe clamp having a generally circular opening defined therethrough, the clamp being integrally formed of a flexible material and having a top portion above the circular opening and a bottom portion below the circular opening, the pipe clamp further comprising a pair of separable edges that may be spread apart to open the pipe clamp;
    an attachment member configured for attachment to the support member, the attachment member interconnected with the top portion of the pipe clamp;
    a first extension arm having a first end interconnected with the bottom portion of the pipe clamp and a second free end extending away from the bottom portion of the pipe clamp in a first direction; and
    a first pipe clip interconnected with the free end of the first extension arm.

19. A hanger for hanging multiple pipes from a support member, the hanger comprising:
    a pipe clamp having a generally circular opening defined therethrough, the clamp having a top portion above the circular opening and a bottom portion below the circular opening;
    an attachment member configured for attachment to the support member, the attachment member being pivotally interconnected with the top portion of the pipe clamp and extending upwardly away from the top portion;
    a first extension arm having a first end interconnected with the bottom portion of the pipe clamp and a second free end extending away from the bottom portion of the pipe clamp in a first direction; and
    a first pipe clip interconnected with the free end of the first extension arm.

* * * * *